(12) United States Patent
van der Heide

(10) Patent No.: US 10,880,611 B2
(45) Date of Patent: *Dec. 29, 2020

(54) MEDIA PREFERENCE DATABASE

(71) Applicant: Sonos, Inc., Santa Barbara, CA (US)

(72) Inventor: Maarten van der Heide, Goleta, CA (US)

(73) Assignee: Sonos, Inc., Santa Barbara, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 16/180,903

(22) Filed: Nov. 5, 2018

(65) Prior Publication Data

US 2019/0075364 A1 Mar. 7, 2019

Related U.S. Application Data

(63) Continuation of application No. 14/263,729, filed on Apr. 28, 2014, now Pat. No. 10,129,599.

(51) Int. Cl.
*H04N 21/475* (2011.01)
*G06F 3/16* (2006.01)
(Continued)

(52) U.S. Cl.
CPC ....... *H04N 21/4756* (2013.01); *G06F 3/0482* (2013.01); *G06F 3/04817* (2013.01);
(Continued)

(58) Field of Classification Search
CPC ......... G06F 17/30035; G06F 17/30867; G06F 17/30876; G06F 3/04817; G06F 3/0482;
(Continued)

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |

(Continued)

FOREIGN PATENT DOCUMENTS

| | | |
|---|---|---|
| EP | 1389853 A1 | 2/2004 |
| KR | 100890993 | 3/2009 |

(Continued)

OTHER PUBLICATIONS

AudioTron Quick Start Guide, Version 1.0, Mar. 2001, 24 pages.
(Continued)

*Primary Examiner* — Ashish Thomas
*Assistant Examiner* — Melissa M. Ohba
(74) *Attorney, Agent, or Firm* — McDonnell Boehnen Hulbert & Berghoff LLP

(57) ABSTRACT

Examples described herein involve media preferences corresponding to multiple user accounts. In an example, a server of a streaming audio service receives, from a first controller interface on a first mobile device, data representing a request to play back a first audio track on a playback device, the first controller interface associated with a first user account of the streaming audio service. In response, the server streams data representing the first audio track to the playback device for playback. While streaming, the server receives, from a second controller interface on a second mobile device, data representing a preference for the first audio track that the playback device is playing back, the second controller interface associated with a second user account of the streaming audio service. The server stores, in a preference database corresponding to the second user account, data representing the preference for the first audio track.

20 Claims, 7 Drawing Sheets

(51) Int. Cl.
*H04R 27/00* (2006.01)
*G06F 16/435* (2019.01)
*G06F 16/955* (2019.01)
*G06F 16/9535* (2019.01)
*G06F 3/0481* (2013.01)
*G06F 3/0482* (2013.01)
G06F 3/01 (2006.01)

(52) U.S. Cl.
CPC .............. *G06F 3/165* (2013.01); *G06F 3/167* (2013.01); *G06F 16/437* (2019.01); *G06F 16/955* (2019.01); *G06F 16/9535* (2019.01); *H04R 27/00* (2013.01); *G06F 3/016* (2013.01); *H04R 2227/005* (2013.01); *H04R 2420/07* (2013.01)

(58) Field of Classification Search
CPC . G06F 3/165; G06F 3/01; G06F 3/016; H04R 2227/005; H04R 2420/07; H04R 27/00
See application file for complete search history.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,108,686 A | 8/2000 | Williams, Jr. | |
| 6,256,554 B1 | 7/2001 | DiLorenzo | |
| 6,349,339 B1 | 2/2002 | Williams | |
| 6,404,811 B1 | 6/2002 | Cvetko et al. | |
| 6,469,633 B1 | 10/2002 | Wachter et al. | |
| 6,519,648 B1 | 2/2003 | Eyal | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang et al. | |
| 6,763,040 B1 | 7/2004 | Hite et al. | |
| 6,778,869 B2 | 8/2004 | Champion | |
| 6,826,283 B1 | 11/2004 | Wheeler et al. | |
| 6,915,176 B2 | 7/2005 | Novelli et al. | |
| 6,933,433 B1 | 8/2005 | Porteus et al. | |
| 6,985,694 B1 | 1/2006 | De Bonet et al. | |
| 7,124,125 B2 | 10/2006 | Cook et al. | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,739 B2 | 6/2007 | Chang et al. | |
| 7,236,773 B2 | 6/2007 | Thomas | |
| 7,295,548 B2 | 11/2007 | Blank et al. | |
| 7,483,538 B2 | 1/2009 | McCarty et al. | |
| 7,496,623 B2 | 2/2009 | Szeto et al. | |
| 7,496,633 B2 | 2/2009 | Szeto et al. | |
| 7,571,014 B1 | 8/2009 | Lambourne et al. | |
| 7,599,685 B2 | 10/2009 | Goldberg et al. | |
| 7,630,501 B2 | 12/2009 | Blank et al. | |
| 7,643,894 B2 | 1/2010 | Braithwaite et al. | |
| 7,657,224 B2 | 2/2010 | Goldberg et al. | |
| 7,657,910 B1 | 2/2010 | McAulay et al. | |
| 7,725,533 B2 | 5/2010 | Szeto et al. | |
| 7,725,551 B2 | 5/2010 | Szeto et al. | |
| 7,739,271 B2 | 6/2010 | Cook et al. | |
| 7,742,740 B2 | 6/2010 | Goldberg et al. | |
| 7,797,471 B2 | 9/2010 | Laefer et al. | |
| 7,835,689 B2 | 11/2010 | Goldberg et al. | |
| 7,853,341 B2 | 12/2010 | McCarty et al. | |
| 7,865,137 B2 | 1/2011 | Goldberg et al. | |
| 7,916,877 B2 | 3/2011 | Goldberg et al. | |
| 7,917,082 B2 | 3/2011 | Goldberg et al. | |
| 7,962,482 B2 | 6/2011 | Handman et al. | |
| 7,987,294 B2 | 7/2011 | Bryce et al. | |
| 7,995,899 B2 | 8/2011 | Heredia et al. | |
| 8,014,423 B2 | 9/2011 | Thaler et al. | |
| 8,023,663 B2 | 9/2011 | Goldberg | |
| 8,028,038 B2 | 9/2011 | Weel | |
| 8,028,323 B2 | 9/2011 | Weel | |
| 8,045,952 B2 | 10/2011 | Qureshey et al. | |
| 8,050,652 B2 | 11/2011 | Qureshey et al. | |
| 8,103,009 B2 | 1/2012 | McCarty et al. | |
| 8,214,873 B2 | 7/2012 | Weel | |
| 8,230,099 B2 | 7/2012 | Weel | |
| 8,234,395 B2 | 7/2012 | Millington et al. | |
| 8,271,114 B2 | 9/2012 | Lydon et al. | |
| 8,483,853 B1 | 7/2013 | Lambourne et al. | |
| 8,595,793 B2 | 11/2013 | Kashyap et al. | |
| 8,910,265 B2 | 12/2014 | Lang et al. | |
| 9,081,780 B2 | 7/2015 | Svendsen et al. | |
| 9,286,384 B2 | 3/2016 | Kuper et al. | |
| 9,335,818 B2 | 5/2016 | Ye et al. | |
| 9,338,514 B2 | 5/2016 | Kumar et al. | |
| 9,367,587 B2 | 6/2016 | Bieschke et al. | |
| 9,374,607 B2 | 6/2016 | Bates et al. | |
| 9,478,247 B2 | 10/2016 | Chen et al. | |
| 9,524,338 B2 | 12/2016 | Van et al. | |
| 9,552,188 B1* | 1/2017 | Qureshey | ........... G06Q 30/0641 |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0056117 A1 | 5/2002 | Hasegawa et al. | |
| 2002/0124097 A1 | 9/2002 | Isely et al. | |
| 2003/0157951 A1 | 8/2003 | Hasty | |
| 2004/0024478 A1 | 2/2004 | Hans et al. | |
| 2004/0088328 A1 | 5/2004 | Cook et al. | |
| 2006/0143236 A1 | 6/2006 | Wu | |
| 2006/0161621 A1 | 7/2006 | Rosenberg et al. | |
| 2006/0212442 A1 | 9/2006 | Conrad et al. | |
| 2006/0212444 A1 | 9/2006 | Handman et al. | |
| 2006/0253436 A1 | 11/2006 | Cook et al. | |
| 2007/0083553 A1 | 4/2007 | Minor | |
| 2007/0088747 A1 | 4/2007 | Cheng et al. | |
| 2007/0142944 A1 | 6/2007 | Goldberg et al. | |
| 2007/0294131 A1 | 12/2007 | Roman et al. | |
| 2008/0052371 A1 | 2/2008 | Partovi et al. | |
| 2008/0163355 A1 | 7/2008 | Chu | |
| 2009/0056525 A1 | 3/2009 | Oppenheimber et al. | |
| 2009/0138805 A1 | 5/2009 | Hildreth | |
| 2009/0307062 A1 | 12/2009 | Lutnick et al. | |
| 2010/0017366 A1 | 1/2010 | Robertson et al. | |
| 2010/0162117 A1 | 6/2010 | Basso et al. | |
| 2010/0205222 A1 | 8/2010 | Gajdos et al. | |
| 2010/0262909 A1 | 10/2010 | Hsieh | |
| 2011/0113051 A1 | 5/2011 | Lindahl et al. | |
| 2011/0246566 A1 | 10/2011 | Kashef et al. | |
| 2011/0265003 A1 | 10/2011 | Schubert et al. | |
| 2012/0070017 A1 | 3/2012 | Dorogusker et al. | |
| 2012/0071996 A1 | 3/2012 | Svendsen | |
| 2013/0073584 A1 | 3/2013 | Kuper et al. | |
| 2013/0073742 A1 | 3/2013 | Piepenbrink et al. | |
| 2013/0117261 A1 | 5/2013 | Sambrani | |
| 2013/0173034 A1 | 7/2013 | Reimann et al. | |
| 2013/0191318 A1 | 7/2013 | Martin et al. | |
| 2013/0191454 A1 | 7/2013 | Oliver et al. | |
| 2013/0218942 A1* | 8/2013 | Willis | ................... G06Q 50/01 709/201 |
| 2013/0279878 A1 | 10/2013 | Haverkamp | |
| 2013/0347018 A1 | 12/2013 | Limp et al. | |
| 2014/0019596 A1 | 1/2014 | Sharkey | |
| 2014/0095998 A1 | 4/2014 | Bull et al. | |
| 2014/0108929 A1* | 4/2014 | Garmark | ............ H04N 21/8549 715/716 |
| 2014/0115114 A1* | 4/2014 | Garmark | .......... H04N 21/47202 709/219 |
| 2014/0123006 A1 | 5/2014 | Chen et al. | |
| 2014/0229894 A1 | 8/2014 | Vinna et al. | |
| 2014/0331332 A1 | 11/2014 | Arrelid et al. | |
| 2015/0066494 A1 | 3/2015 | Salvador et al. | |
| 2015/0095170 A1 | 4/2015 | Lang et al. | |
| 2015/0161686 A1 | 6/2015 | Williams et al. | |

(56) References Cited

U.S. PATENT DOCUMENTS

2015/0312299 A1 10/2015 Chen
2016/0057499 A1 2/2016 Foerster et al.

FOREIGN PATENT DOCUMENTS

WO 200153994 7/2001
WO 2003093950 A2 11/2003

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Search Report dated Oct. 4, 2017, issued in connection with EP Application No. 15786532.0, 8 pages.
Final Office Action dated Jan. 30, 2017, issued in connection with U.S. Appl. No. 14/263,729, filed Apr. 28, 2014, 18 pages.
International Bureau, International Preliminary Report on Patentability dated Apr. 3, 2014, issued in connection with International Application No. PCT/US2012/056467, filed Sep. 21, 2011, 11 pages.
International Bureau, International Preliminary Report on Patentability dated Nov. 10, 2016, issued in connection with International Application No. PCT/US2015/027759, filed Apr. 27, 2015, 9 pages.
International Searching Authority, International Search Report and Written Opinion dated Jul. 13, 2015, issued in connection with International Application No. PCT/US2015/027759, filed Apr. 27, 2015, 12 pages.
International Searhing Authority, International Search Report and Written Opinion dated Feb. 28, 2013, issued in connection with International Application No. PCT/US2012/056467, filed Sep. 21, 2012, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes with MP3," TechTV Vault. Jun. 28, 2000 retrieved Jul. 10, 2014, 2 pages.
Non-Final Office Action dated Oct. 4, 2017, issued in connection with U.S. Appl. No. 14/621,595, filed Feb. 13, 2015, 18 pages.
Non-Final Office Action dated Jul. 11, 2016, issued in connection with U.S. Appl. No. 14/263,729, filed Apr. 28, 2014, 14 pages.
Non-Final Office Action dated Nov. 29, 2017, issued in connection with U.S. Appl. No. 14/263,729, filed Apr. 28, 2014, 28 pages.
Notice of Allowance dated Apr. 16, 2018, issued in connection with U.S. Appl. No. 14/621,595, filed Feb. 13, 2015, 11 pages.
Notice of Allowance dated Sep. 6, 2018, issued in connection with U.S. Appl. No. 14/263,729, filed Apr. 28, 2014, 21 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

| Database Account | Service Provider | Media Content | Preference |
|---|---|---|---|
| DB_user1 | SP1 -- user1 | SP1_Track2 | ++ |
| DB_user1 | SP1 -- user1 | SP1_Track4 | ... |
| DB_user1 | SP3 -- u2f | SP3_Genre5 | + |
| DB_user1 | SP4 -- user33j | SP4_Track3 | ++ |
| DB_user3 | SP1 -- user1 | SP1_Track87 | . |
| DB_user3 | SP1 -- user1 | SP1_Track45 | ++ |
| DB_user3 | SP1 -- user1 | SP1_Track9 | +++ |
| DB_user3 | SP3 -- u2f | SP3_Genre33 | ... |
| DB_user3 | SP3 -- u2f | SP3_Genre5 | ... |
| DB_user3 | SP3 -- user33j | SP4_Track44 | , |
| DB_user8 | SP4 -- u2i | SP4_Track3 | ... |

MEDIA PREFERENCE DATABASE

CROSS REFERENCE TO RELATED APPLICATIONS

This application claims priority under 35 U.S.C. § 120 to, and is a continuation of, U.S. nonprovisional patent application Ser. No. 14/263,729, filed on Apr. 28, 2014, entitled "Media Preference Database," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 9 shows aspects of an example preference database.

Figure 1:
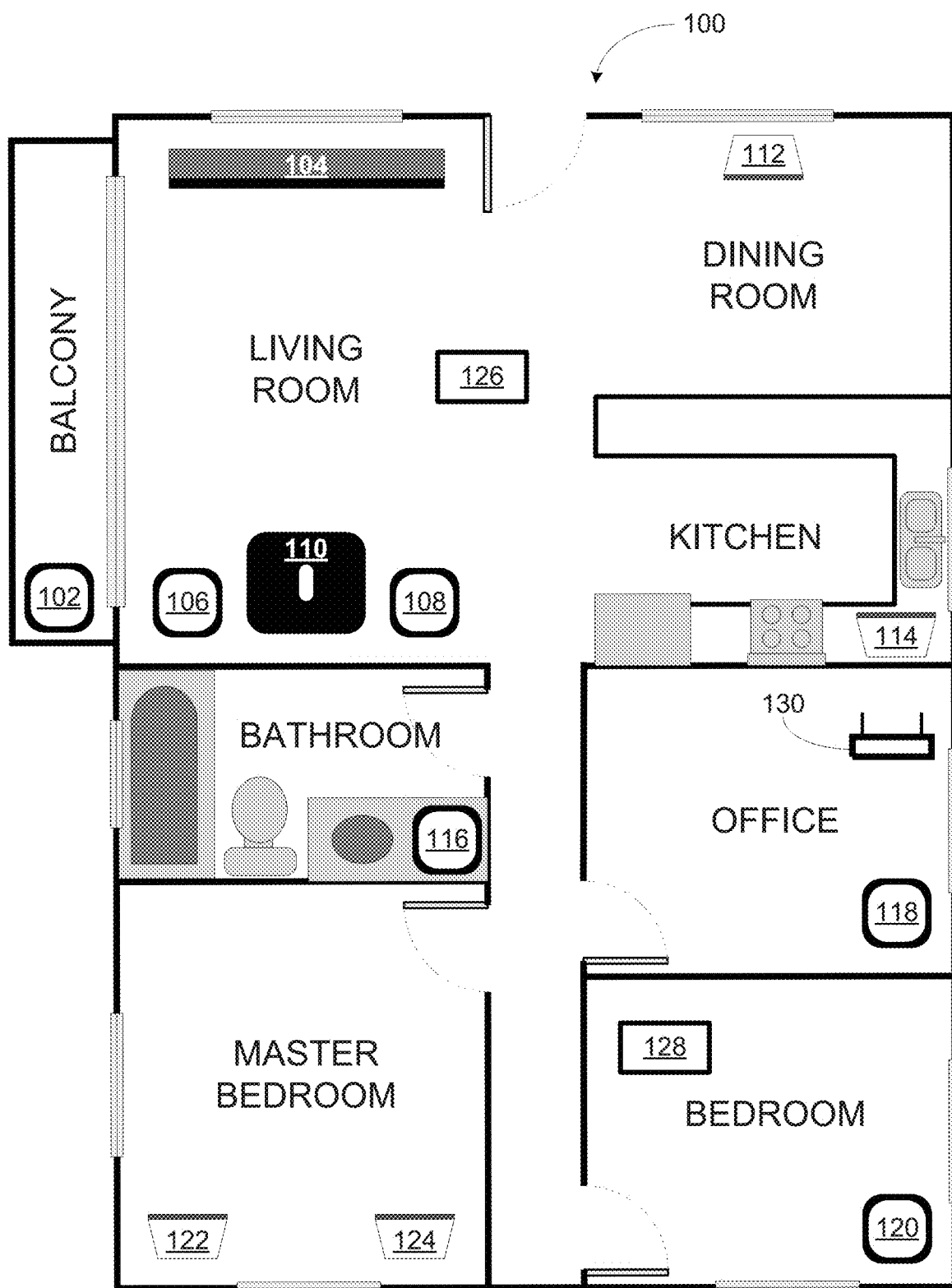
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some embodiments described herein involve a media playback system populating a preference database with preferences received for media items. Such a database may be used to manage playback of media content by the media playback system and, as a result, help enhance experiences of users of the media playback.

In one embodiment, the media playback system may receive a preference associated with a media item provided by a service provider. The media playback system may store the preference and information on the media item in a preference database affiliated with the media playback system. The preference and information may be stored in association with a user account for accessing the media playback system. As a result, the media playback system can then manage playback of media content based on the stored preference and information.

In one example, the media playback system may forward the preference to the service provider so the service provider can provide media content based on the provided preference. It may be beneficial to forward the preference in this way if the service provider is a service that provides playlists or recommends music to a user based on the user's preferences.

In another embodiment, data indicating a user profile associated with a service provider user account may also be received. The user profile may be one of a plurality of user profiles associated with the service provider user account. For example, different user profiles associated with the same service provider user account may be used to access and/or obtain content from the service provider via the media playback system. Further, each of the users may have a user profile associated with the service provider user account.

Accordingly, the received preference data may be stored in the preference database in association with the user profile used to provide the preference. The media playback system can then manage playback of media content according to the stored preference of a specified user profile.

In a further embodiment, data indicating a user account, other than the user account used to obtain the media item, may be received along with the preference associated with the media item. For instance, a first user account/user profile may be used to request the media item for playback by the media playback system. Subsequently, a second user account/user profile may be used to indicate a preference associated with the media item. As such, the preference data may be stored in the preference database in association with the second user account/user profile. The media playback system can then manage playback of media content according to the stored preference of the second user account/ profile, when the second user account/profile is accessing the media playback system.

As indicated above, the examples provided herein include a media playback system populating a preference database with preferences received for media items. In one embodiment, a method is provided. The method involves receiving, by a media playback system, a preference associated with a media item. The media item is provided by a service provider. The method further involve storing in a preference database affiliated with the media playback system, (i) the preference, (ii) a user account associated with the media playback system, and (iii) information associated with the media item.

In another embodiment, a computing device is provided. The computing device includes a processor and memory having stored thereon instructions executable by the processor to cause the computing device to perform functions. The functions include receiving a preference associated with a media item. The media item is provided by a service provider. The functions also include storing in a preference database affiliated with the media playback system, (i) the preference, (ii) a user account associated with the media playback system, and (iii) information associated with the media item.

In a further embodiment, a non-transitory computer readable memory is provided. The non-transitory computer readable memory has stored thereon instructions executable by a computing device to cause the computing device to perform functions. The functions include receiving a preference associated with a media item. The media item is provided by a service provider. The functions also include storing in a preference database affiliated with the media playback system, (i) the preference, (ii) a user account associated with the media playback system, and (iii) information associated with the media item.

In another embodiment, a method is provided. The method involves receiving, by a computing device, (i) data indicating a preference associated with a media item, and (ii) data indicating a user profile associated with a user account for a service provider. The user profile is one of a plurality of user profiles associated with the user account. The method further involves storing in a preference database, by the computing device, the preference in association with the user profile, and information associated with the media item.

In a further embodiment, a computing device is provided. The computing device includes a processor and memory having stored thereon instructions executable by the processor to cause the computing device to perform functions. The functions include receiving (i) data indicating a preference associated with a media item, and (ii) data indicating a user profile associated with a user account for a service provider. The user profile is one of a plurality of user profiles associated with the user account. The functions also include storing in a preference database the preference in association with the user profile, and information associated with the media item.

In yet another embodiment, a non-transitory computer readable memory is provided. The non-transitory computer readable memory has stored thereon instructions executable by a computing device to cause the computing device to perform functions. The functions include receiving (i) data indicating a preference associated with a media item, and (ii) data indicating a user profile associated with a user account for a service provider. The user profile is one of a plurality of user profiles associated with the user account. The functions also include storing in a preference database the preference in association with the user profile, and information associated with the media item.

In another embodiment, a method is provided. The method involves receiving, by a computing device, (i) data indicating a preference associated with a media item provided to a first user account, and (ii) data indicating a second user account associated with the preference, and storing in a preference database, the preference in association with the second user account, and information associated with the media item.

In a further embodiment, a computing device is provided. The computing device includes a processor and memory having stored thereon instructions executable by the processor to cause the computing device to perform functions. The functions include receiving (i) data indicating a preference associated with a media item provided to a first user account, and (ii) data indicating a second user account associated with the preference, and storing in a preference database, the preference in association with the second user account, and information associated with the media item.

In yet another embodiment, a non-transitory computer readable memory is provided. The non-transitory computer readable memory has stored thereon instructions executable by a computing device to cause the computing device to perform functions. The functions include receiving (i) data indicating a preference associated with a media item provided to a first user account, and (ii) data indicating a second user account associated with the preference, and storing in a preference database, the preference in association with the second user account, and information associated with the media item.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
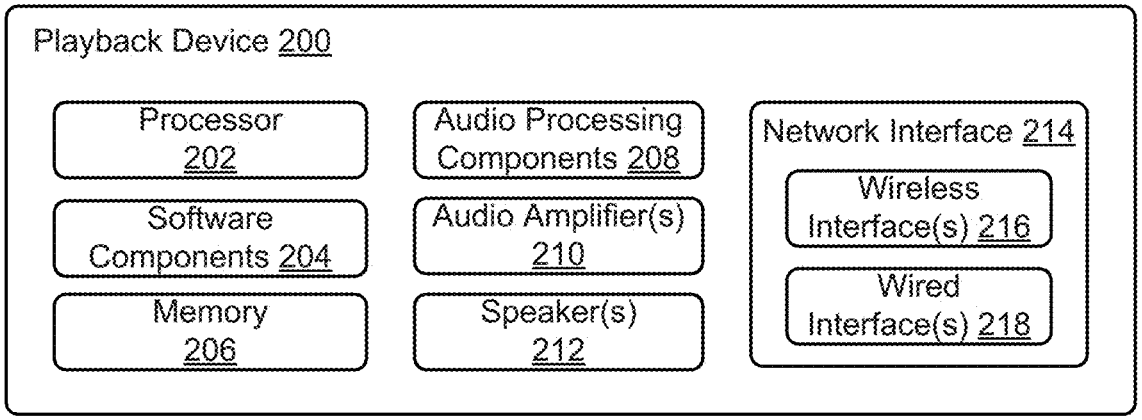
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
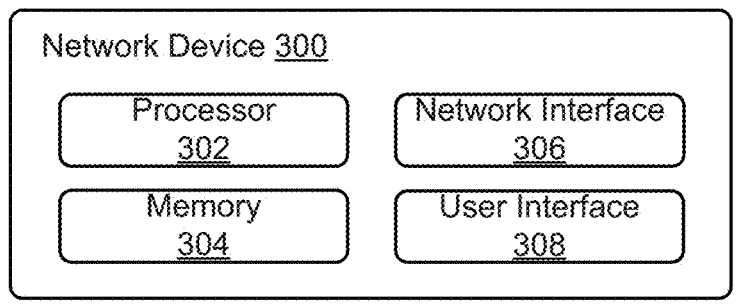
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
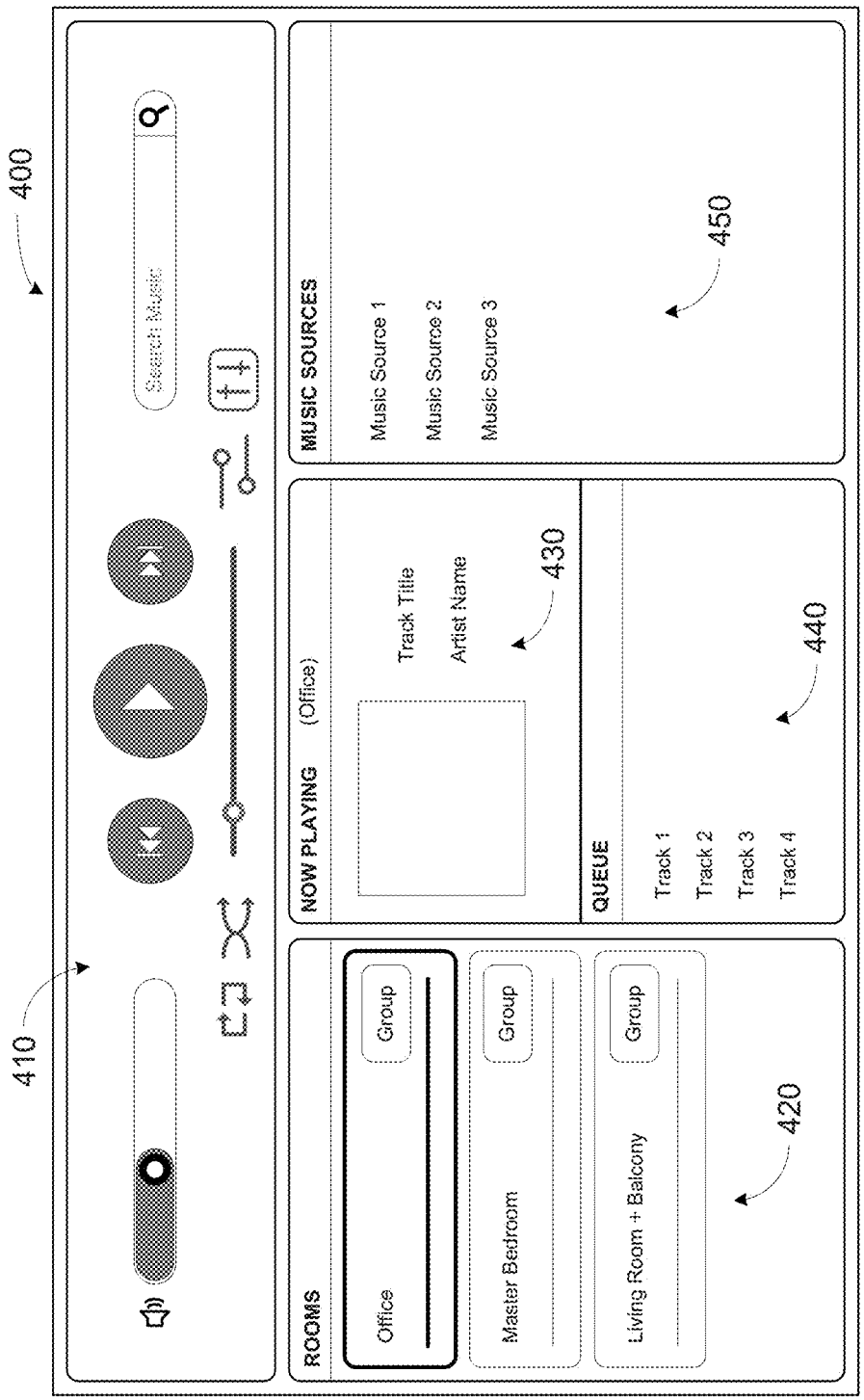
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Storing Preferences in a Preference Database

As discussed above, embodiments described herein may involve a media playback system populating a preference database with preferences received for media items. FIG. 500 shows an example media playback system environment 500 within which the embodiments may be implemented. As shown, the media playback system environment 500 includes an example service provider 502, an example media system server 504, an example media playback system 506, and an example controller 508. Each of the service provider 502, media system server 504, media playback system, and controller 508 may communicate with each other either directly, or indirectly via another device, over a local area network (LAN), wide area network (WAN) or some combination thereof.

The media playback system 506 may be a playback system such as that described above in connection to FIG. 1, and may include one or more playback devices configured to play media content in synchrony within one or more playback zones. The media playback system 506 may be accessed by multiple users within a household. In one example, each user of the media playback system 506 may have an associated user profile for accessing the media playback system 506.

The service provider 502 may provide media content for playback by the media playback system 506. In one example, the service provider 502 may be a media streaming service. The content provided by the service provider 502 may include individual media items or collections of media items (i.e. albums, playlists, radio channels, etc.). The service provider 502 may provide media content according to specific requests for particular media items (i.e. requests for tracks, albums, playlists, etc), or requests for a range of media content (i.e. modern jazz, classic rock, music for studying, etc).

The service provider 502 may also provide catered media content based on user preferences and input. For instance, if a service provider user account for the service provider 502 is associated with a positive preference for music by a particular musician, the service provider 502 may provide to the service provider user account, music by the particular musician, music similar to music by the particular musician, and/or music by other musicians that have influenced the particular musician, or were influenced by the particular musician. Other examples of services that may be available through service provider 502 are also possible.

In one example, the media playback system 506 may access the service provider 502 using a service provider user account. The service provider user account may be an account tied to a subscription for accessing the service provider 502 and obtaining media content from the service provider 502. In the case multiple user profiles are associated with the media playback system 506, one or more of the multiple user profiles may use the service provider user account to access the service provider 502.

The media system server 504 may be a server associated with the media playback system 506. The media system server 504 may store information, such as playback device information, playback zone information, service provider association information, and/or user profile information, among other information for media playback systems including the media playback system 506.

The controller 508 may be a controller such as the control device 300 shown and discussed in connection to FIG. 3. The controller 508 may be a dedicated controller for the media playback system 506, or any device having installed thereon software application capable of accessing, managing, and controlling the media playback system 506. In some cases, the controller 508 may be associated with a particular user profile for accessing the media playback system 506.

For instance, the controller 508 may be a personal mobile device of a user associated with the particular user profile. Alternatively, the controller 508 may be associated with multiple user profiles for accessing the media playback system 506.

In one example, an input indicating a preference associated with a media item may be provided using the controller 508. In one case, the input may be provided for a media item being played by the media playback system 506. In another case, the input may be provided for a media item for which information is provided on the controller 508 (i.e. during browsing of media items that are available from the service provider 502).

Figure 5:
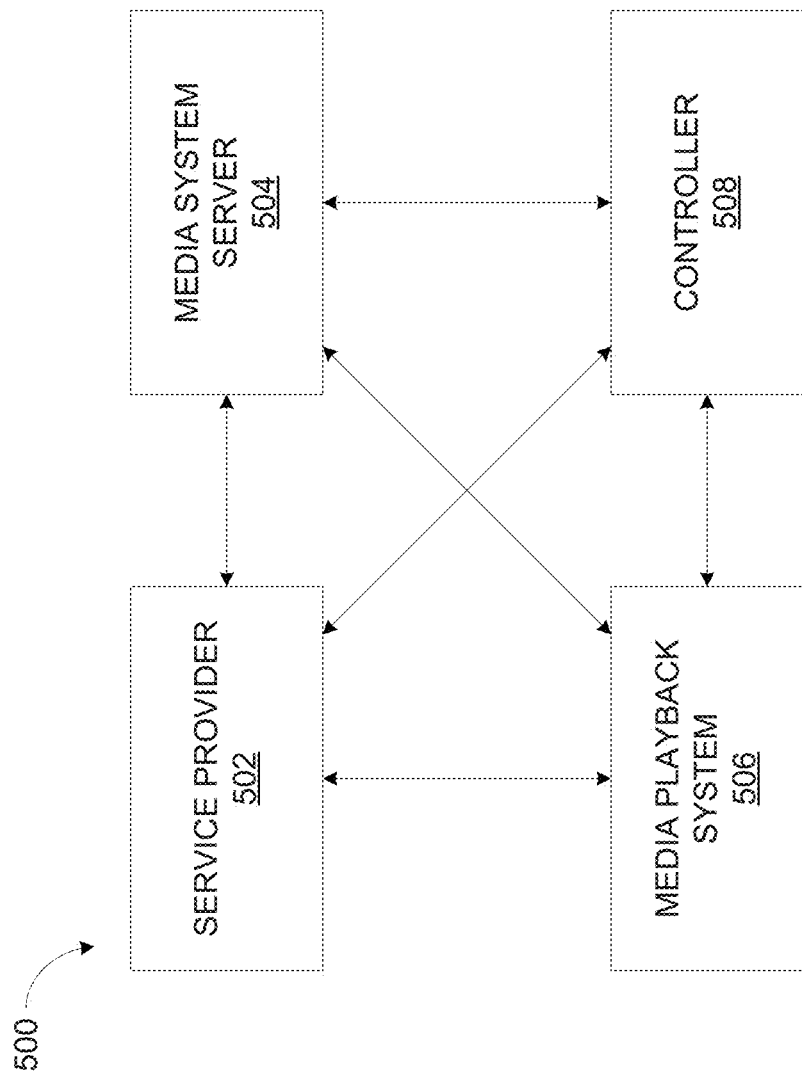
FIG. 5 shows an example media playback system environment.
Figure 6:
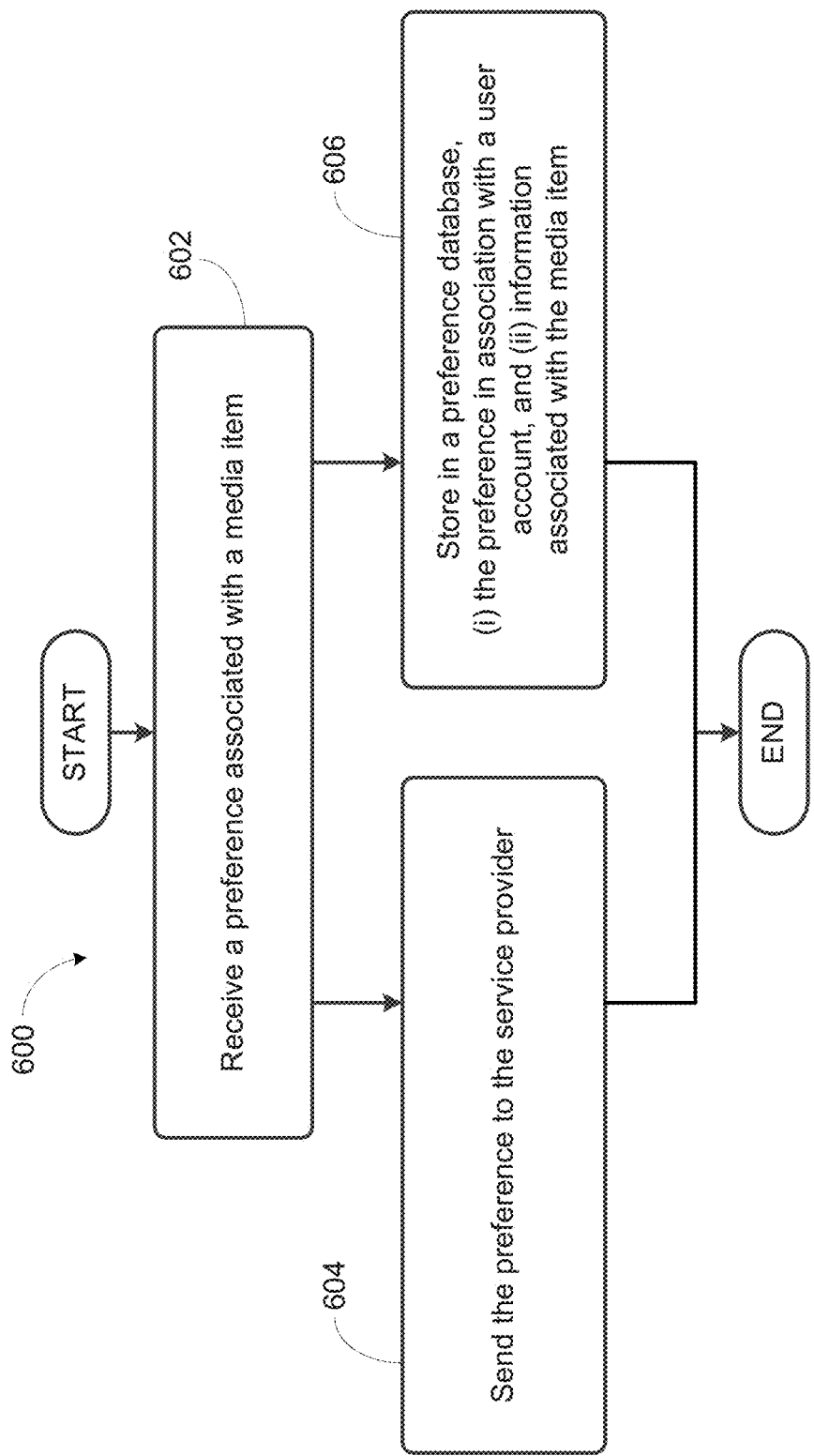
FIG. 6 shows an example flow diagram of a first method for storing a media preference in a preference database.

In one example, the input indicating the preference may involve a selection of an icon indicating a positive preference for the media item. In another example, the input indicating the preference may involve a selection of an icon indicating a negative preference for the media item. For instance, the icon may be a "thumb up" icon, a "thumb down" icon, a "like" icon, or a "dislike" icon, among other examples. In another example, the input indicating the preference may be an implicit indication of a preference. For instance, a selection of the media item may implicitly indicate a positive preference, while a skipping of the media item may implicitly indicate a negative preference. In a further example, the input indicating the preference may involve a selection of a rating of the media item. For instance, the input may involve selecting a number of stars out of five stars to indicate a rating for the media item. Other examples are also possible.

a. Storing a Media Preference in a Media Playback Device-Affiliated Preference Database In one embodiment, media preferences provided to the media playback system may be stored in a preference database that is affiliated with the media playback system. Method 600 shown in FIG. 6 presents an example of such an embodiment that can be implemented within an operating environment involving, for example, the media playback system 100 of FIG. 1, one or more of the playback device 200 of FIG. 2, one or more of the control device 300 of FIG. 3, and the media playback system environment 500 of FIG. 5. Method 600 may include one or more operations, functions, or actions as illustrated by one or more of blocks 602-606. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, the method 600 involves receiving a preference associated with a media item. Referring back to FIG. 5, the media item may be a media item that is available from the service provider 502, and the preference may be received from the controller 508. In one example, the preference may be received when the media playback system 506 is playing the media item. In another example, the preference may be received when information for the media item is displayed on the controller 608. In this example, the media playback system 506 may or may not be playing the media item.

In one example, the service provider 502 may be a service that provides playlists and/or recommends media items to a user account based on media preferences of the user account. In one example, the service provider 502 may solicit preferences from a user account accessing the service provider 502. For instance, when information associated with media content available from the service provider 502 is provided on a controller interface, such as that shown and discussed in connection to FIG. 4, textual or graphical representation may also be provided to solicit preference indications for the respective media content. A subsequently received preference may then be used by the service provider 502 to identify media content to provide or recommend to the user account. As previously suggested, the media playback system 506 may or may not be playing the media item when the information associated with the media item is displayed and/or when the preference is received.

In one example, the received preference may be a binary value, such as either a "like" or "dislike" or a "thumb up" or "thumb down." In another example, the received preference may be a gradient value, such as a rating from zero to ten. Other examples are also possible. A preference type of the preference that is received may depend on a preference type used by the service provider 502. For instance, if the service provider 502 uses a gradient value, then the received preference may be a gradient value. In another case, the preference may be received according to a preference type used by the media playback system 506, regardless of the preference type used by the service provider 502.

In this example, the media playback system 506, upon receiving the preference, may proceed to block 604, where the method 600 involves sending the preference to the service provider 502. In one case, the preference provided to the service provider 502 according to the preference type used by the service provider 502. In another case, if the preference was received according to the reference type used by the media playback system 506, the preference may be converted to the preference type used by the service provider 502 before sending the preference to the service provider 502. In one example, if the media playback system 506 preference type is a gradient from one to ten and the service provider 502 uses binary preferences, then any preference above five or above may be converted to a positive preference, while any preference below five may be converted to a negative preference. Other examples are also possible.

In addition to providing the preference to the service provider 502, at block 606, the method 600 may further involve storing in a preference database (i) the preference in association with a user account, and (ii) information associated with the media item. The preference database may be affiliated with a media playback system such as the media playback system 506, and any preference received by the media playback system may be stored in the preference database. As such, preferences associated with media content available from the service provider 502 as well as preferences associated with media content available from other service providers may all be stored in the preference database.

In one example, the preference database may be stored locally on a device within the media playback system 506 or on a local device associated with the media playback system 506, such as a controller device, and/or a NAS in communication with the media playback system 506. In another example, the preference database may be stored on a remote server associated with the media playback system 506. For instance, the preference database may be stored on the media system server 504.

As indicated above, the received preference may be in accordance with a preference type used by the service provider 502. In one example, preferences may be stored in the preference database according to the preference type that the preferences were received in. As such, the preference received in connection to block 602 may be stored according to the preference type used by the service provider 502. In this case, a preference received from another service provider may be received and stored according to a different preference type.

In another example, the preference database may store preferences according to a normalized preference type. As such, the received preference may be converted or translated from a first preference type to a second preference type before the preference is stored in the preference database. For instance, the preference database may store preference according to a normalized gradient from zero to ten. In this case, if the received preference is in a binary value, a positive preference (i.e. "like," "thumb up," etc.) may be converted to a preference of seven in the normalized preference gradient, and a negative preference (i.e. "dislike," "thumb down," etc.) may be converted to a preference of three in the normalized preference gradient scale, and stored accordingly. Other examples are also possible.

As indicated above, the media playback system 506 may be accessing the service provider 502 using a particular service provider user account when a preference is provided. In one example, the preference may be stored in association with the particular service provider user account. In another example, the preference may be stored in association with a preference database account, or a user profile for the media playback system 506. In this case, the user profile may be associated with different service provider user accounts for different service providers used by the media playback device 506. In a further example, the preference may be stored in association with both the service provider user account and the preference database account or user profile. Other examples are also possible.

The information associated with the media item that is stored in the preference database may include metadata for the media item. The metadata may include a track title, an artist name, an album title, a genre, and a release year, among others. The information associated with the media item may also include a service-provider identification for the media item. In the case the media item is provided by service provider 502, the service-provider identification for the media item may be an identification that is unique to the service provider 502. If another service provider also provides the same media item, the other service provider may have a different service-provider identification for the media item.

As indicated above, the preference may be received via the controller 508 when information associated with the media item is displayed, whether the media playback system 506 is playing the media item or not. In one case, if the information associated with the media item that is displayed was provided by the media playback system 506 or if the media playback system 506 was playing the media item when the preference was provided, the media playback system 506 may already have information associated with the media item, and may store the information in the preference database. In another case, if the media playback system 506 does not already have the information associated with the media item, or if the media playback system 506 only has a portion of the information associated with the media item, the media playback system 506 may retrieve the information associated with the media item from the service provider 502, and store the retrieved information in the preference database. Other examples are also possible.

In the examples discussed above, the service provider 502 is generally discussed as a service provider that may provide media content to a user account based at least partially on preferences associated with the user account. In some embodiments, however, the service provider 502 may be a service that does not utilize any user preferences when providing media content. In these embodiments, block 604 of the method 600 may be omitted, but the preference may still be received and stored in a preference database according to blocks 602 and 606. In one example, textual or graphical representations may be provided on the controller interface inviting the user of the controller 508 to indicate a preference for a media item whenever media content is accessed via the media playback system 506, regardless of what types of services the service provider 502 or other service providers offer.

b. Storing a Media Preference in Association with a Media Playback System User Profile As suggested above, the media playback system 506 may access the service provider 502 using a particular service provider user account, and multiple users may have access to the service provider 502 using the particular service provider user account via the media playback system 506. In one example, the multiple users may each have a sub-account or user profile associated with the particular service provider user account (e.g. individual accounts within a family service plan). In another example, each of the multiple users may have an individual account or user profile associated with the media playback system 506 for accessing the media playback system 506 and any service providers the media playback system 506 has access to. As such, in one example, each of the media playback system accounts or user profiles can access the service provider 502 using the particular service provider user account via the media playback system 506. Other examples, including some combination of the examples described above, are also possible.

A service provider such as the service provider 502 may aggregate and use media preferences associated with a service provider user account to provide media content to the service provider user account. This may be the case even if the service provider user account is used by multiple user profiles associated with media playback system 506. In other words, the provided media content is catered to the service provider user account, rather than the individual user profiles accessing the service provider via the service provider user account.

Figure 7:
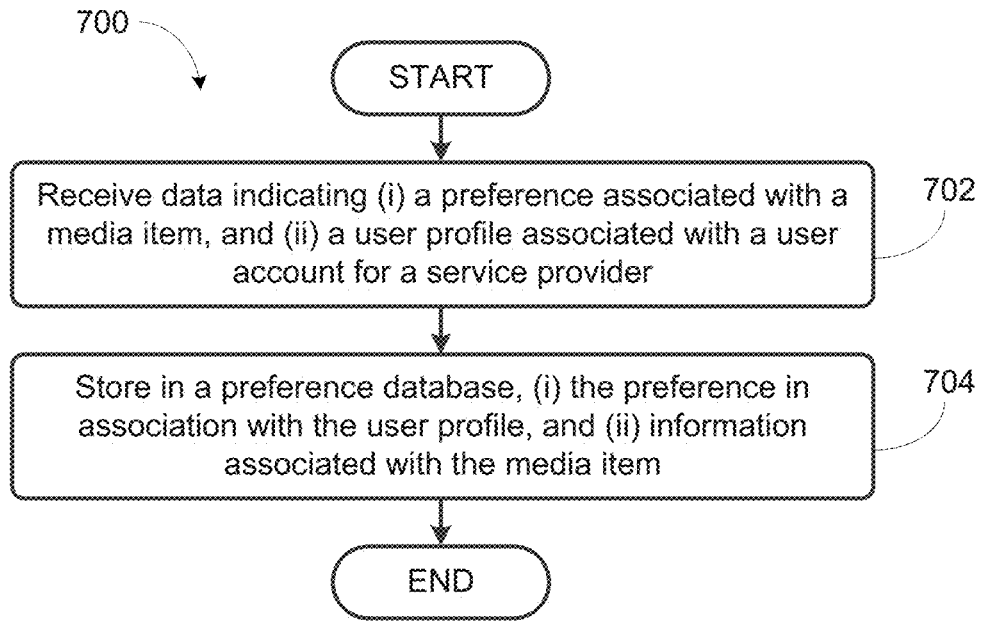
FIG. 7 shows an example flow diagram of a second method for storing a media preference in a preference database.

FIG. 7 shows an example flow diagram of a method for storing preferences in association with those user profiles. Method 700 shown in FIG. 7 presents an embodiment of a method that can be implemented within an operating environment involving, for example, the media playback system 100 of FIG. 1, one or more of the playback device 200 of FIG. 2, one or more of the control device 300 of FIG. 3, and the media playback system environment 500 of FIG. 5. Method 700 may include one or more operations, functions, or actions as illustrated by one or more of blocks 702-704. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 702, the method 700 involves receiving data indicating (i) a preference associated with a media item, and (ii) a user profile associated with a user account for a service provider. In one example, the preference associated with the media item may be similar to that described above in connection to block 602 of FIG. 6. As such, any discussions above relating to the received preference may be applicable to block 702 as well.

The user profile may be one of a plurality of user profiles associated with the user account. In one example, the user account may be a service provider user account for accessing the service provider 502. In one case, the plurality of user profiles may be sub-accounts of the service provider user account. In another case, the plurality of user profiles may be accounts for accessing the media playback system 506, some or all of which may access the service provider 502 using the service provider user account used by media playback system 506 to access the service provider 502. Other examples are also possible.

In one example, the received data may specify the user profile. In one case, a user may indicate a user profile to use when the user accesses the media playback system 506 via the controller 508. As such, when the user provides a media preference, the preference may be associated with the user profile. Accordingly, the user profile may be received from the controller 508 along with the preference when the preference is received.

In another example, the user profile may be determined based on a controller from which the preference was received. According to some communication protocols, an identification of a source of transmitted data may be included when the data is transmitted. As such, an identification of the controller from which the preference is received may be included when the data is received. In one case, if the controller 508 is associated with a particular user profile, such as if the controller 508 is a personal device for user of the particular user profile, preferences received from the controller 508 may be associated with the particular user profile. Other examples are also possible.

At block 704, the method 700 involves storing in a preference database, (i) the preference in association with the user profile, and (ii) information associated with the media item. In one example, storing of the preference and the information associated with the media item may be similar to that discussed above in connection with block 606 of the method 600. As such, discussions above relating to the storing of preferences and information associated with media items may be applicable to block 704 as well. In this case however, the preference may be stored in association with the indicated user profile. In one instance, the preference may be stored in association with the user profile in addition to being stored in association with a user account, such as a service provider user account. In another instance, the preference may be stored in association with the user profile instead of being stored in association with the user account. Other examples are also possible.

In contrast to the method 600 shown in FIG. 6, the method 700 shown in FIG. 7 does not include a block for sending the received preference to a service provider. Nevertheless, one having ordinary skill in the art will appreciate that the step of forwarding the preference may be implemented for method 700. In particular, the preference may be forwarded to a service provider if the service provider is a service that provides or recommends media content based on user preferences.

c. Storing a Media Preference Based on User Account Providing the Preference

As discussed above, the media playback system 506 may be accessed by multiple accounts or user profiles. As such, a first user account may be used to cause the media playback system 506 to play a media item, and a second user account may be used to indicate a preference associated with the media item. For example, a first user may use the first user account to play some music for group of friends on the media playback system 506. In one embodiment, if one of the friends uses a second user account to indicate a preference for the music being played, the preference may be stored in the preference database in association with the second user account in addition to, or instead of in association with the first user account.

Figure 8:
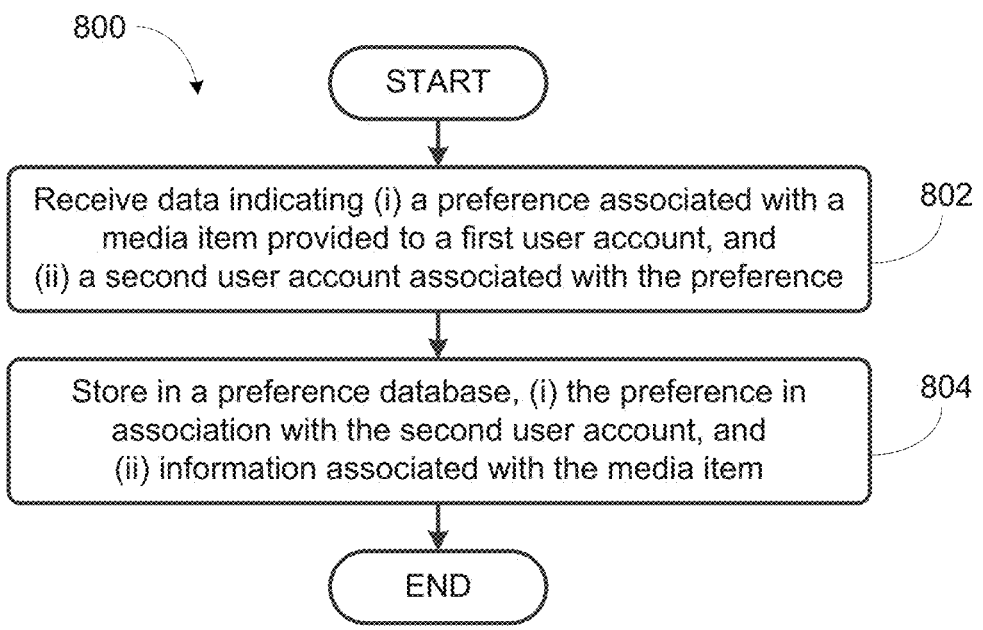
FIG. 8 shows an example flow diagram of a third method for storing a media preference in a preference database.

FIG. 8 shows an example flow diagram of a method 800 for storing a preference in association with a user account through which the media preference is provided. Method 800 shown in FIG. 8 presents an embodiment of a method that can be implemented within an operating environment involving, for example, the media playback system 100 of FIG. 1, one or more of the playback device 200 of FIG. 2, one or more of the control device 300 of FIG. 3, and the media playback system environment 500 of FIG. 5. Method 800 may include one or more operations, functions, or actions as illustrated by one or more of blocks 802-804. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 802, the method 800 involves receiving data indicating (i) a preference associated with a media item provided to a first user account, and (ii) a second user account associated with the preference. In one example, the preference associated with the media item may be similar to that described above in connection to block 602 of FIG. 6 and block 702 of FIG. 7. As such, discussions above relating to the received preference may be applicable to block 802 as well.

In this embodiment, however, the preference may be associated with the second user account, different from the first user account used to play the media item. In one example, more than one service provider user account may be used via the media playback system 506 to access the service provider 502. As such, the first and second user accounts may both be service provider user accounts for accessing the service provider 502. In another example, the first and second user accounts may both be user profiles for accessing the media playback system 506. The first and second accounts/user profiles may access the service provider 502 via the media playback system 506 using the same or different service provider accounts. Other examples are also possible. Similar to that discussed in connection to block 702, the second user account that is associated with the preference may be specified in the received data, or determined based on the source from which the data was received.

At block 804, the method 800 involves storing in a preference database, (i) the preference in association with the second user account, and (ii) information associated with the media item. In one example, storing of the preference and the information associated with the media item may be similar to that discussed above in connection to block 606 of the method 600 and block 704 of method 700. As such, discussions above relating to the storing of preferences and information associated with media items may be applicable to block 804 as well.

In this case however, the preference may be stored in association with the second user account through which the preference was provided. As indicated above, the second user account may be a service provider user account for the service provider 502, or a user profile for accessing the media playback system 506. In one instance, the preference may be stored in association with the second user account in addition to being stored in association with the first user account. In another instance, the preference may be stored in association with the second user account instead of being stored in association with the first user account. Like the second user account, the first user account may be a service provider user account or a user profile.

Like method 700 of FIG. 7, method 800 of FIG. 8 also does not include a block for sending the received preference to a service provider. Nevertheless, one having ordinary skill in the art will appreciate that the step of forwarding the preference may be implemented for method 800. In particular, the preference may be forwarded to a service provider if the service provider is a service that provides or recommends media content based on user preferences.

In one example, if the second user account is, or is tied to a service provider user account for the service provider 502 providing the media item, a message may be sent to the service provider 502 indicating the preference and the second user account (or associated service provider user account). The service provider 502 may then associate the preference with the second user account and may subsequently utilize the preference when providing or recommending media items to the second user account.

In some cases, the service provider 502 may automatically associate the preference with the first user account because the media item associated with the preference was provided to the first user account. In such a case, the message sent to the service provider 502 indicating the preference may further indicate that the preference should not be associated with the first user account (or service provider user account tied to the first user account). Other examples are also possible.

FIG. 9 shows an example preference database 900 within which preferences may be stored according to the embodiments described above. As such, the database 900 may be affiliated with the media playback system 506, and in some cases, may be stored on the media system server 504. As shown, the preference database 900 includes columns for "Database Account," "Service Provider," "Media Content," and "Preference."

In this example, the entries in the Database Account column may be user profiles used to access the media playback system 506. The entries in the Media Content column may be media items for which a respective user profile has a preference for. The entries in the Service Provider column may be service providers from which the media items are available. In some cases, the Service Provider column may indicate both the service provider providing the media item and a service provider user account used by the respective user profile to access the media item.

The entries in the Preference column indicate the preference of a respective profile for a respective media item. In this illustrative example, the preferences are in the form of "+" and "−" values, with a highest positive value of "+++" and a lowest negative value of "−−−." As indicated previously, the preferences in the Preference column may represent normalized values converted from different preference types used by different service providers.

For illustration purposes, the Database Account includes "DB_user1," "DB_user3," and "DB_user8." As shown, DB_user1 has a preference of "++" for media content SP4_Track3 provided by service provider "SP4-user33j." In one example, SP4_Track3 may be a music track. In this illustrative example, SP4-user33j may indicate that the media content SP1_Track3 was accessed by DB_user1 on service provider "SP4" using service provider user account "user33j," when providing a preference of "++."

Also shown in example preference database 900, DB_user1 has a preference "+" for "SP3_Genre5" accessed via "SP3-u2f." SP3_Genre5 in this example may be a playlist or channel for a specific genre of music that DB_user1 accesses from service provider "SP3" using service provider user account "u2f."

Further shown in example preference database 900, DB_user8 has a preference of "−−" for the media content SP4_Track3, which DB_user1 has a preference of "++" for. In this case, DB_user8 may have accessed SP4_Track3 on service provider SP4 using service provider user account "u2i." In one example, DB_user1 and DB_user8 may both use the media playback system 506 to enjoy media content, but may use different service provider user accounts to access service provider SP4. Further, DB_user1 and DB_user8 may have differing opinions about SP4_Track3. As indicated in discussions above, in one example, one of DB_user1 and DB_user8 may have accessed service provider SP4 to playing SP4_Track3 for both to enjoy. However, while DB_user1 enjoyed SP4_Track3, DB_user8 did not. As such, each of DB_user1 and DB_user8 indicated their respective preferences for SP4_Track3. Accordingly, the respective preferences were stored in association with the respective user profiles DB_user1 and DB_user8.

One having ordinary skill in the art will appreciate that the examples discussed above are for illustration purposes only. Similarly, the preference database 900 and the entries shown in FIG. 9 are for illustration purposes only and should not be considered limiting, as other database formats for storing media preference are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware.

Accordingly, the examples provided are not the only way(s) to implement such systems, methods, apparatus, and/or articles of manufacture.

As indicated above, the present application involves a media playback system populating a preference database with preferences received for media items. In one embodiment, a method is provided. The method involves receiving, by a media playback system, a preference associated with a media item. The media item is provided by a service provider. The method further involve storing in a preference database affiliated with the media playback system, (i) the preference, (ii) a user account associated with the media playback system, and (iii) information associated with the media item.

In another embodiment, a computing device is provided. The computing device includes a processor and memory having stored thereon instructions executable by the processor to cause the computing device to perform functions. The functions include receiving a preference associated with a media item. The media item is provided by a service provider. The functions also include storing in a preference database affiliated with the media playback system, (i) the preference, (ii) a user account associated with the media playback system, and (iii) information associated with the media item.

In a further embodiment, a non-transitory computer readable memory is provided. The non-transitory computer readable memory has stored thereon instructions executable by a computing device to cause the computing device to perform functions. The functions include receiving a preference associated with a media item. The media item is provided by a service provider. The functions also include storing in a preference database affiliated with the media playback system, (i) the preference, (ii) a user account associated with the media playback system, and (iii) information associated with the media item.

In another embodiment, a method is provided. The method involves receiving, by a computing device, (i) data indicating a preference associated with a media item, and (ii) data indicating a user profile associated with a user account for a service provider. The user profile is one of a plurality of user profiles associated with the user account. The method further involves storing in a preference database, by the computing device, the preference in association with the user profile, and information associated with the media item.

In a further embodiment, a computing device is provided. The computing device includes a processor and memory having stored thereon instructions executable by the processor to cause the computing device to perform functions. The functions include receiving (i) data indicating a preference associated with a media item, and (ii) data indicating a user profile associated with a user account for a service provider. The user profile is one of a plurality of user profiles associated with the user account. The functions also include storing in a preference database the preference in association with the user profile, and information associated with the media item.

In yet another embodiment, a non-transitory computer readable memory is provided. The non-transitory computer readable memory has stored thereon instructions executable by a computing device to cause the computing device to perform functions. The functions include receiving (i) data indicating a preference associated with a media item, and (ii) data indicating a user profile associated with a user account for a service provider. The user profile is one of a plurality of user profiles associated with the user account. The functions also include storing in a preference database the preference in association with the user profile, and information associated with the media item.

In another embodiment, a method is provided. The method involves receiving, by a computing device, (i) data indicating a preference associated with a media item provided to a first user account, and (ii) data indicating a second user account associated with the preference, and storing in a preference database, the preference in association with the second user account, and information associated with the media item.

In a further embodiment, a computing device is provided. The computing device includes a processor and memory having stored thereon instructions executable by the processor to cause the computing device to perform functions. The functions include receiving data indicating (i) a preference associated with a media item provided to a first user account, and (ii) data indicating a second user account associated with the preference, and storing in a preference database, the preference in association with the second user account, and information associated with the media item.

In yet another embodiment, a non-transitory computer readable memory is provided. The non-transitory computer readable memory has stored thereon instructions executable by a computing device to cause the computing device to perform functions. The functions include receiving (i) data indicating a preference associated with a media item provided to a first user account, and (ii) data indicating a second user account associated with the preference, and storing in a preference database, the preference in association with the second user account, and information associated with the media item.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A method to be performed by one or more servers of a streaming audio service, the method comprising:

receiving, via a network interface from a first controller interface on a first mobile device, data representing a request to play back a first audio track on one or more playback devices of a media playback system, wherein the first controller interface is associated with a first user account of the streaming audio service;

in response to receiving the data representing the request to play back the first audio track, streaming data representing the first audio track to the one or more playback devices of the media playback system for playback by one or more playback devices of the media playback system;

while streaming the data representing first audio track to the one or more playback devices of the media playback system, receiving, via the network interface from a second controller interface on a second mobile device, data representing a preference for the first audio track that the one or more playback devices are playing back, wherein the second controller interface is associated with a second user account of the streaming audio service;

storing, in a preference database corresponding to the second user account of the streaming audio service, data representing the preference for the first audio track, the preference database corresponding to the second user account comprising data representing respective preferences for multiple audio tracks;

receiving, via the network interface from the second controller interface on the second mobile device, data representing a request for a recommendation of audio tracks based on the preference database corresponding to the second user account;

in response to receiving the data representing the request for a recommendation of audio tracks based on the preference database corresponding to the second user account, determining one or more second audio tracks based on the preference database corresponding to the second user account; and causing, via the network interface, at least one playback device of the media playback system to play back the determined one or more second audio tracks.

2. The method of claim 1, wherein the method further comprises:

while streaming the data representing first audio track to the one or more playback devices of the media playback system, receiving, via the network interface from the first controller interface on the first mobile device, a preference for the first audio track that the one or more playback devices are playing back; and storing, in a preference database corresponding to the first user account of the streaming audio service, data representing the preference for the first audio track, the preference database corresponding to the first user account comprising data representing respective preferences for multiple audio tracks.

3. The method of claim 1, wherein the second controller interface is a native controller application of the media playback system, and wherein the method further comprises:

converting the preference for the first audio track from a first preference format that is native to the media playback system to a second preference format of the streaming audio service.

4. The method of claim 3, wherein converting the preference for the first audio track from the first preference format that is native to the media playback system to the second preference format of the streaming audio service comprises converting between a numerical preference format and a non-numerical preference format.

5. The method of claim 1, wherein receiving data representing the preference for the first audio track that the one or more playback devices are playing back comprises receiving data indicating one or more of the following: (a) a positive preference for the first audio track, (b) a negative preference for the first audio track, (c) a selection of the first audio track, (d) a skipping of the first audio track, and (e) a rating of the first audio track.

6. The method of claim 1, wherein the first mobile device and the second mobile device are connected to a wireless local area network, and wherein the one or more playback devices are connected to the wireless local area network.

7. The method of claim 1, wherein the method further comprises:

causing, via the network interface, the second controller interface to display graphical representations of the determined one or more second audio tracks; and receiving, via the network interface from the second controller interface on the second mobile device, data representing a request to play back the one or more determined second audio tracks on the at least one playback device of the media playback system, wherein the one or more servers of the streaming audio service cause the at least one playback device of the media playback system to play back the one or more determined second audio tracks on the at least one playback device of the media playback system in response to receiving the data representing the request to play back the one or more determined second audio tracks on the at least one playback device of the media playback system.

8. A system comprising one or more servers of a streaming audio service, the one or more servers comprising at least one processor, a network interface, and data storage storing instructions that are executable by the at least one processor to configure the one or more servers to perform functions comprising:

receiving, via the network interface from a first controller interface on a first mobile device, data representing a request to play back a first audio track on one or more playback devices of a media playback system, wherein the first controller interface is associated with a first user account of the streaming audio service;

in response to receiving the data representing the request to play back the first audio track, streaming data representing the first audio track to the one or more playback devices of the media playback system for playback by one or more playback devices of the media playback system;

while streaming the data representing first audio track to the one or more playback devices of the media playback system, receiving, via the network interface from a second controller interface on a second mobile device, data representing a preference for the first audio track that the one or more playback devices are playing back, wherein the second controller interface is associated with a second user account of the streaming audio service;

storing, in a preference database corresponding to the second user account of the streaming audio service, data representing the preference for the first audio track, the preference database corresponding to the second user account comprising data representing respective preferences for multiple audio tracks;

receiving, via the network interface from the second controller interface on the second mobile device, data representing a request for a recommendation of audio tracks based on the preference database corresponding to the second user account;

in response to receiving the data representing the request for a recommendation of audio tracks based on the preference database corresponding to the second user account, determining one or more second audio tracks based on the preference database corresponding to the second user account; and causing, via the network interface, at least one playback device of the media playback system to play back the determined one or more second audio tracks.

9. The system of claim 8, wherein the functions further comprise:

while streaming the data representing first audio track to the one or more playback devices of the media playback system, receiving, via the network interface from the first controller interface on the first mobile device, a preference for the first audio track that the one or more playback devices are playing back; and storing, in a preference database corresponding to the first user account of the streaming audio service, data representing the preference for the first audio track, the preference database corresponding to the first user account comprising data representing respective preferences for multiple audio tracks.

10. The system of claim 8, wherein the second controller interface is a native controller application of the media playback system, and wherein the functions further comprise:

converting the preference for the first audio track from a first preference format that is native to the media playback system to a second preference format of the streaming audio service.

11. The system of claim 10, wherein converting the preference for the first audio track from the first preference format that is native to the media playback system to the second preference format of the streaming audio service comprises converting between a numerical preference format and a non-numerical preference format.

12. The system of claim 8, wherein receiving data representing the preference for the first audio track that the one or more playback devices are playing back comprises receiving data indicating one or more of the following: (a) a positive preference for the first audio track, (b) a negative preference for the first audio track, (c) a selection of the first audio track, (d) a skipping of the first audio track, and (e) a rating of the first audio track.

13. The system of claim 8, wherein the first mobile device and the second mobile device are connected to a wireless local area network, and wherein the one or more playback devices are connected to the wireless local area network.

14. The system of claim 8, wherein the functions further comprise:

causing, via the network interface, the second controller interface to display graphical representations of the determined one or more second audio tracks; and receiving, via the network interface from the second controller interface on the second mobile device, data representing a request to play back the one or more determined second audio tracks on the at least one playback device of the media playback system, wherein the one or more servers of the streaming audio service cause the at least one playback device of the media playback system to play back the one or more determined second audio tracks on the at least one playback device of the media playback system in response to receiving the data representing the request to play back the one or more determined second audio tracks on the at least one playback device of the media playback system.

15. A tangible non-transitory computer-readable medium having stored thereon instructions executable by one or more servers of to cause the one or more servers to perform a method comprising:

receiving, via a network interface from a first controller interface on a first mobile device, data representing a request to play back a first audio track on one or more playback devices of a media playback system, wherein the first controller interface is associated with a first user account of a streaming audio service;

in response to receiving the data representing the request to play back the first audio track, streaming data representing the first audio track to the one or more playback devices of the media playback system for playback by one or more playback devices of the media playback system;

while streaming the data representing first audio track to the one or more playback devices of the media playback system, receiving, via the network interface from a second controller interface on a second mobile device, data representing a preference for the first audio track that the one or more playback devices are playing back, wherein the second controller interface is associated with a second user account of the streaming audio service;

storing, in a preference database corresponding to the second user account of the streaming audio service, data representing the preference for the first audio track, the preference database corresponding to the second user account comprising data representing respective preferences for multiple audio tracks;

receiving, via the network interface from the second controller interface on the second mobile device, data representing a request for a recommendation of audio tracks based on the preference database corresponding to the second user account;

in response to receiving the data representing the request for a recommendation of audio tracks based on the preference database corresponding to the second user account, determining one or more second audio tracks based on the preference database corresponding to the second user account; and causing, via the network interface, at least one playback device of the media playback system to play back the determined one or more second audio tracks.

16. The tangible non-transitory computer-readable medium of claim 15, wherein the method further comprises:

while streaming the data representing first audio track to the one or more playback devices of the media playback system, receiving, via the network interface from the first controller interface on the first mobile device, a preference for the first audio track that the one or more playback devices are playing back; and storing, in a preference database corresponding to the first user account of the streaming audio service, data representing the preference for the first audio track, the preference database corresponding to the first user account comprising data representing respective preferences for multiple audio tracks.

17. The tangible non-transitory computer-readable medium of claim 15, wherein the second controller interface is a native controller application of the media playback system, and wherein the method further comprises:

converting the preference for the first audio track from a first preference format that is native to the media playback system to a second preference format of the streaming audio service.

18. The tangible non-transitory computer-readable medium of claim 17, wherein converting the preference for the first audio track from the first preference format that is native to the media playback system to the second preference format of the streaming audio service comprises converting between a numerical preference format and a non-numerical preference format.

19. The tangible non-transitory computer-readable medium of claim 15, wherein receiving data representing the preference for the first audio track that the one or more playback devices are playing back comprises receiving data indicating one or more of the following: (a) a positive preference for the first audio track, (b) a negative preference for the first audio track, (c) a selection of the first audio track, (d) a skipping of the first audio track, and (e) a rating of the first audio track.

20. The tangible non-transitory computer-readable medium of claim 15, wherein the first mobile device and the second mobile device are connected to a wireless local area network, and wherein the one or more playback devices are connected to the wireless local area network.

* * * * *